United States Patent [19]

Fujimoto et al.

[11] Patent Number: 5,422,740
[45] Date of Patent: Jun. 6, 1995

[54] IMAGE FORMING APPARATUS WHICH EFFECTS OUTPUT GRAY LEVEL CORRECTION

[75] Inventors: Masaya Fujimoto; Haruo Yamamoto; Shuji Hayashi; Tetsuya Kagawa, all of Osaka, Japan

[73] Assignee: Mita Industrial Co., Ltd., Osaka, Japan

[21] Appl. No.: 45,706

[22] Filed: Apr. 14, 1993

[30] Foreign Application Priority Data

Jul. 13, 1992 [JP] Japan .................................. 4-209739

[51] Int. Cl.⁶ .......................... G03F 3/08; H04N 1/46; H04N 1/40
[52] U.S. Cl. ..................................... 358/521; 358/522; 358/534; 358/456
[58] Field of Search ..................... 382/50, 51; 358/530, 358/534, 455, 456, 457, 518, 504, 515, 519, 521, 522, 523, 524

[56] References Cited

U.S. PATENT DOCUMENTS

| | | | |
|---|---|---|---|
| 4,410,909 | 10/1983 | Ueda | 358/518 |
| 4,641,267 | 2/1987 | Asai | 364/414 |
| 4,654,722 | 4/1987 | Alkofer | 358/284 |
| 4,805,013 | 2/1989 | Dei | 358/518 |
| 4,906,942 | 4/1990 | Nakai | 329/318 |
| 4,962,433 | 10/1990 | Matsushima | 358/335 |
| 5,136,392 | 8/1992 | Ganse | 358/330 |
| 5,164,822 | 11/1992 | Muramatsu | 358/75 |
| 5,189,521 | 2/1993 | Ohtsubo | 358/296 |

*Primary Examiner*—Edward L. Coles, Sr.
*Assistant Examiner*—Allan A. Esposo
*Attorney, Agent, or Firm*—Beveridge, DeGrandi, Weilacher & Young

[57] ABSTRACT

In an image forming apparatus according to the present invention, characteristics correcting data for correcting input gray level-output gray level characteristics for each of a plurality of steps into which input gray levels are divided are inputted by inputting means. At the time of image formation processing, input gray level-output gray level characteristic data are corrected on the basis of each of the characteristics correcting data inputted by the inputting means.

4 Claims, 13 Drawing Sheets

F/G. 12

IMAGE FORMING APPARATUS WHICH EFFECTS OUTPUT GRAY LEVEL CORRECTION

BACKGROUND OF THE INVENTION

1. Field of the Invention

The present invention relates to a density processing method in an image forming apparatus such as a copying machine.

2. Description of the Prior Art

In a digital color copying machine, a document is first irradiated by an exposure lamp in a scanner section, and its reflected light is detected by a CCD (Charge Coupled Device) and sequentially converted into an electric signal. In this case, an image of the document is separated for each color and for each pixel by the CCD into an electric signal corresponding to the density of each pixel. This electric signal is sent to an image processing section.

In the image processing section, an output of the CCD is digitally converted and then, the variations of the CCD, the exposure lamp and the like are corrected for each signal having each color (B (blue), G (green) or R (red)) in a shading correcting section. Signals having respective colors (BGR signals) are converted into toner density signals (YMC (yellow, magenta and cyan) signals) in a BGR-YMC converting section. In addition, a BK (black) signal is produced from the YMC signals in a BK producing section.

Thereafter, in the YMC signals and the BK signals, the density levels of the respective colors are corrected in accordance with the characteristics of a filter and toner in a color correcting section. Furthermore, color conversion of a designated color is performed in a color converting section, and processing, such as trimming or masking, is performed in a synthesis processing section. Thereafter, in a density processing section, the level of a digital density signal sent is converted depending on a developing color, the copy density designated in an operating section, the type of document image designated in the operating section, and the like. Thereafter, the digital density signal is sent to a printer section through a variable magnification and movement processing section for performing variable magnification and movement processing in the main scanning direction of an image, to accomplish recording on paper.

Meanwhile, in the digital copying machine or the digital color copying machine, density processing using a dither method has been generally performed in the density processing section so as to obtain a gray scale image. A digital color copying machine already developed by the applicant of the present application is so adapted that characteristic data representing a gray level of a recording pixel relative to a gray level of a reading pixel (hereinafter referred to as input gray level-output gray level characteristic data) have been previously generated using a dither matrix having 2×2 pixels as one block and stored in a memory device, to find data representing a gray level of a recording pixel (hereinafter referred to as output gray level data) corresponding to data representing a gray level of a reading pixel (hereinafter referred to as input gray level data) inputted on the basis of the input gray level-output gray level characteristic data. There are 256 gray levels of the reading pixel, and there are 64 gray levels of the recording pixel. A density processing section in this copying machine is shown in FIG. 4.

The density processing section 10 comprises an address generating circuit 101 and a table memory 102 and is controlled by a CPU 20. The CPU 20 comprises a ROM 21 and RAMs 22 and 23. A plurality of types of input gray level-output gray level characteristic data previously generated are stored in the ROM 21 depending on a developing color (M, C, Y or BK), the copy density designated in the operating section, and the type of document image designated in the operating section.

The CPU 20 transfers one type of input gray level-output gray level characteristic data corresponding to the developing color, and the copy density and the type of document image designated in the operating section out of the plurality of types of input gray level-output gray level characteristic data from the data ROM 21 to the table memory 102. Image data representing a gray level of a reading pixel (input gray level data) and a signal representing the position of the reading pixel (hereinafter referred to as a pixel position signal) comprising a line signal HSYNC and a dot signal CLK (not shown) are sent to the address generating circuit 101. The address generating circuit 101 outputs a signal for specifying an address storing output gray level data corresponding to the input gray level data and the pixel position signal sent (a pixel in the dither matrix which corresponds to the reading pixel) out of addresses in the table memory 102. Consequently, the output gray level data stored at the specified address is outputted from the table memory 102.

Input gray level-output gray level characteristics are subtly changed in many cases even if copying machines are of the same type. In order to provide characteristics suitable for all the copying machines, the input gray level-output gray level characteristics must be corrected for each copying machine.

SUMMARY OF THE INVENTION

A first object of the present invention is to provide an image forming apparatus capable of correcting input gray level-output gray level characteristics for each image forming apparatus such that the input gray level-output gray level characteristics become characteristics suitable for each image forming apparatus.

A second object of the present invention is to provide an image forming apparatus capable of graphing input gray level-output gray level characteristics and outputting the same.

In an image forming apparatus comprising a density processing section in which input gray level-output gray level characteristic data are previously generated and stored in first storing means, the input gray level-output gray level characteristic data are transferred to second storing means, and an address in the second storing means is specified on the basis of input gray level data inputted so that output gray level data stored in the specified address in the second storing means is outputted, a first image forming apparatus according to the present invention is characterized by comprising inputting means for inputting characteristics correcting data for correcting input gray level-output gray level characteristics for each of a plurality of steps into which input gray levels are divided and correcting means for correcting the input gray level-output gray level characteristic data stored in the first storing means on the basis of each of the characteristics correcting data inputted by the inputting means.

In the first image forming apparatus according to the present invention, the characteristics correcting data for correcting the input gray level-output gray level characteristics for each of the plurality of steps into which the input gray levels are divided is inputted by the inputting means. At the time of image formation processing, the input gray level-output gray level characteristic data are corrected on the basis of each of the characteristics correcting data inputted by the inputting means. Consequently, the input gray level-output gray level characteristics can be corrected for each image forming apparatus such that the input gray level-output gray level characteristics become characteristics suitable for each image forming apparatus.

In an image forming apparatus comprising a density processing section in which input gray level-output gray level characteristic data are previously generated and stored in first storing means, the input gray level-output gray level characteristic data are transferred to second storing means, and an address in the second storing means is specified on the basis of input gray level data inputted so that output gray level data stored in the specified address in the second storing means is outputted, a second image forming apparatus according to the present invention is characterized by comprising inputting means for inputting characteristics correcting data for correcting input gray level-output gray level characteristics for each of a plurality of steps into which input gray levels are divided, correcting means for correcting the input gray level-output gray level characteristic data stored in the first storing means on the basis of each of the characteristics correcting data inputted by the inputting means, and reversal phenomenon correcting means for making such correction, when there is a portion where such a reversal phenomenon that an output gray level corresponding to a low input gray level is higher than an output gray level corresponding to a high input gray level occurs in the input gray level-output gray level characteristic data obtained by the correction using the correcting means, that the output gray level corresponding to the low input gray level is lower than the output gray level corresponding to the high input gray level.

In the second image forming apparatus according to the present invention, the characteristics correcting data for correcting the input gray level-output gray level characteristics for each of the plurality of steps into which the input gray levels are divided is inputted by the inputting means. At the time of image formation processing, the input gray level-output gray level characteristic data are corrected on the basis of each of the characteristics correcting data inputted by the inputting means. In addition, when there is a portion where such a reversal phenomenon that an output gray level corresponding to a low input gray level is higher than an output gray level corresponding to a high input gray level occurs in the input gray level-output gray level characteristic data obtained by the correction, such correction is made that the output gray level corresponding to the low input gray level is lower than the output gray level corresponding to the high input gray level. Consequently, the input gray level-output gray level characteristics can be corrected for each image forming apparatus so that the input gray level-output gray level characteristics become characteristics suitable for each image forming apparatus.

In the first or second image forming apparatus according to the present invention, data for modifying access addresses to the above described second storing means is used as the above described characteristics correcting data, and means for converting the access addresses to the second storing means in accordance with the characteristics correcting data to correct the input gray level-output gray level characteristics in accordance with the characteristics correcting data is used as the above described correcting means. In this case, the access addresses to the second storing means may be transfer destination addresses from the first storing means to the second storing means corresponding to the input gray level-output gray level characteristic data or specified addresses in the second storing means corresponding to the input gray level data inputted. In addition, it is preferable to provide means for graphing the input gray level-output gray level characteristic data obtained by the correction using the above described correcting means or the input gray level-output gray level characteristic data obtained by the correction using the correcting means and after correcting the above described reversal phenomenon by the above described reversal phenomenon correcting means and outputting the same.

In an image forming apparatus comprising a density processing section for outputting output gray level data corresponding to input gray level data inputted on the basis of input gray level-output gray level characteristic data, editing data storing means for storing image editing data, and a printer section, a third image forming apparatus according to the present invention is characterized by comprising means for graphing the input gray level-output gray level characteristic data and developing the data into the editing data storing means, and means for printing the graphed data developed into the editing data storing means in the printer section. As the above described editing data storing means, a prescan memory for storing image data read at the time of prescanning, for example, can be used.

In the third image forming apparatus according to the present invention, the input gray level-output gray level characteristic data is graphed and developed into the editing data storing means. The graphed data developed into the editing data storing means is printed in the printer section. Consequently, the input gray level-output gray level characteristics can be graphed and outputted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
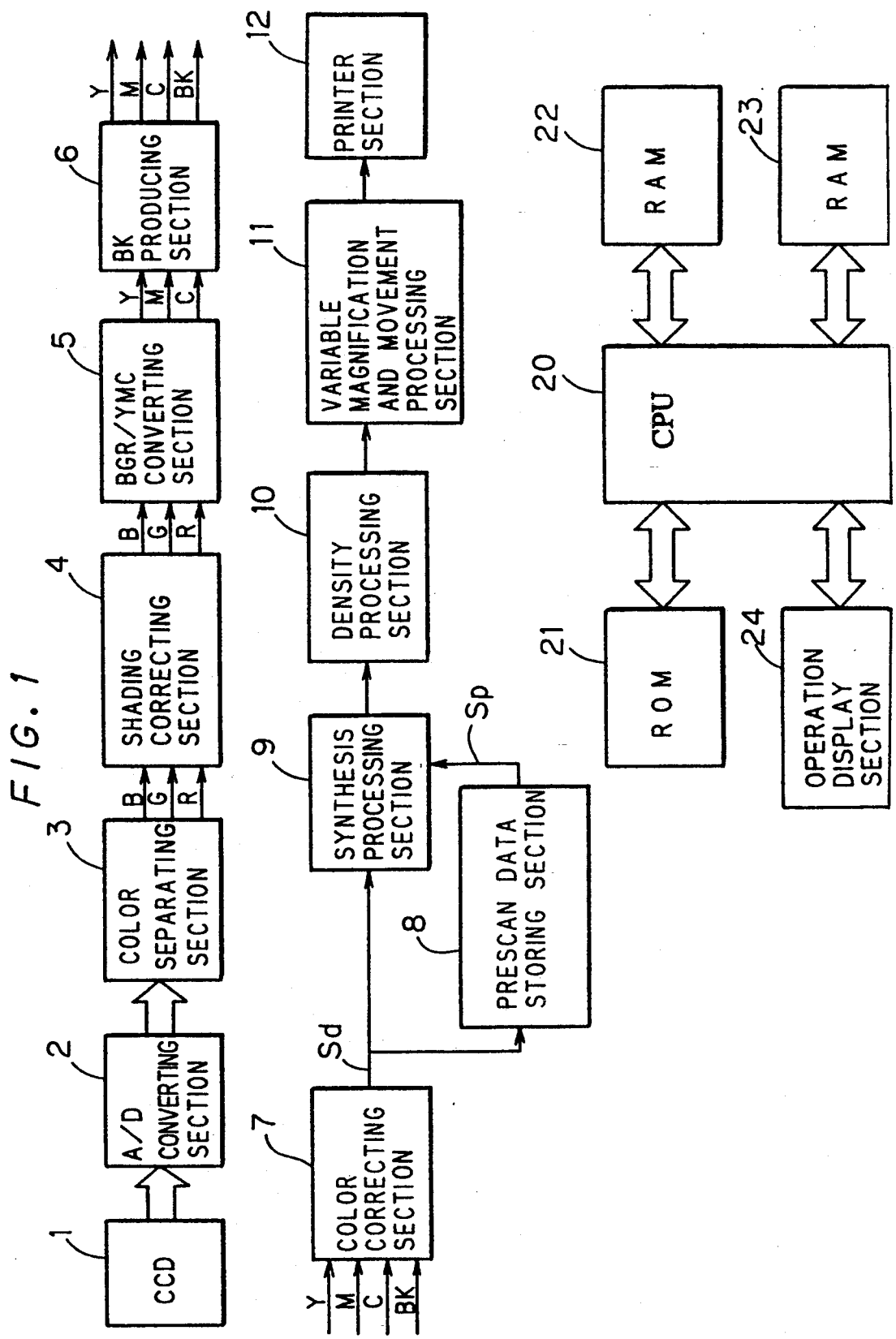
FIG. 1 is an electrical block diagram showing the entire construction of a digital color copying machine.

Referring now to the drawings, description is made of an embodiment in a case where the present invention is applied to a digital color copying machine.

FIG. 1 illustrates the entire electrical construction of a digital color copying machine.

In a digital color copying machine, a document is first irradiated by an exposure lamp in a scanner section, and its reflected light is detected by a CCD 1 and sequentially converted into an electric signal. In this case, an image of the document is separated for each color and for each pixel by the CCD 1 into an electric signal corresponding to the density of each pixel. This electric signal is sent to an image processing section.

In the image processing section, an output of the CCD 1 is digitally converted in an analog-to-digital converting section 2 and then, is sent to a color separating section 3. From the color separating section 3, a density signal is outputted for each color (B, G or R). The variations of the CCD 1, the exposure lamp and the like are corrected for each signal having each color (B, G or R) in a shading correcting section 4. Signals having respective colors (BGR signals) are converted into toner density signals (YMC signals) in a BGR-YMC converting section 5. In addition, a BK signal is produced from the YMC signals in a BK producing section 6.

Thereafter, in the YMC signals and the BK signals, the density levels of the respective colors are corrected in accordance with the characteristics of a filter and toner in a color correcting section 7. Furthermore, in a synthesis processing section 9, processing such as trimming or masking is performed. Furthermore, at the time of prescanning, an output of the color correcting section 7 is sent to a prescan data storing section 8 including a prescan memory 83 (see FIG. 2).

The processing such as trimming or masking is performed in the synthesis processing section 9 and then, the level of a digital density signal sent is converted depending on a developing color, the copy density designated in an operating section, the type of document image designated in the operating section, and the like in a density processing section 10. Thereafter, the digital density signal is sent to a printer section 12 through a variable magnification and movement processing section 11 for performing variable magnification and movement processing in the main scanning direction of an image, to accomplish recording on paper.

The above described respective sections in the digital color copying machine are controlled by a central processing unit (CPU) 20. The CPU 20 comprises a ROM 21 for storing its program, input gray level-output gray level characteristic data and the like, a RAM 22 for storing necessary data, a RAM 23 backed up by a battery for storing, for example, characteristics correcting data for correcting input gray level-output gray level characteristic data (hereinafter referred to as a backup RAM), and an operation display section 24 for inputting information such as characteristics correcting data and displaying various information.

Figure 2:
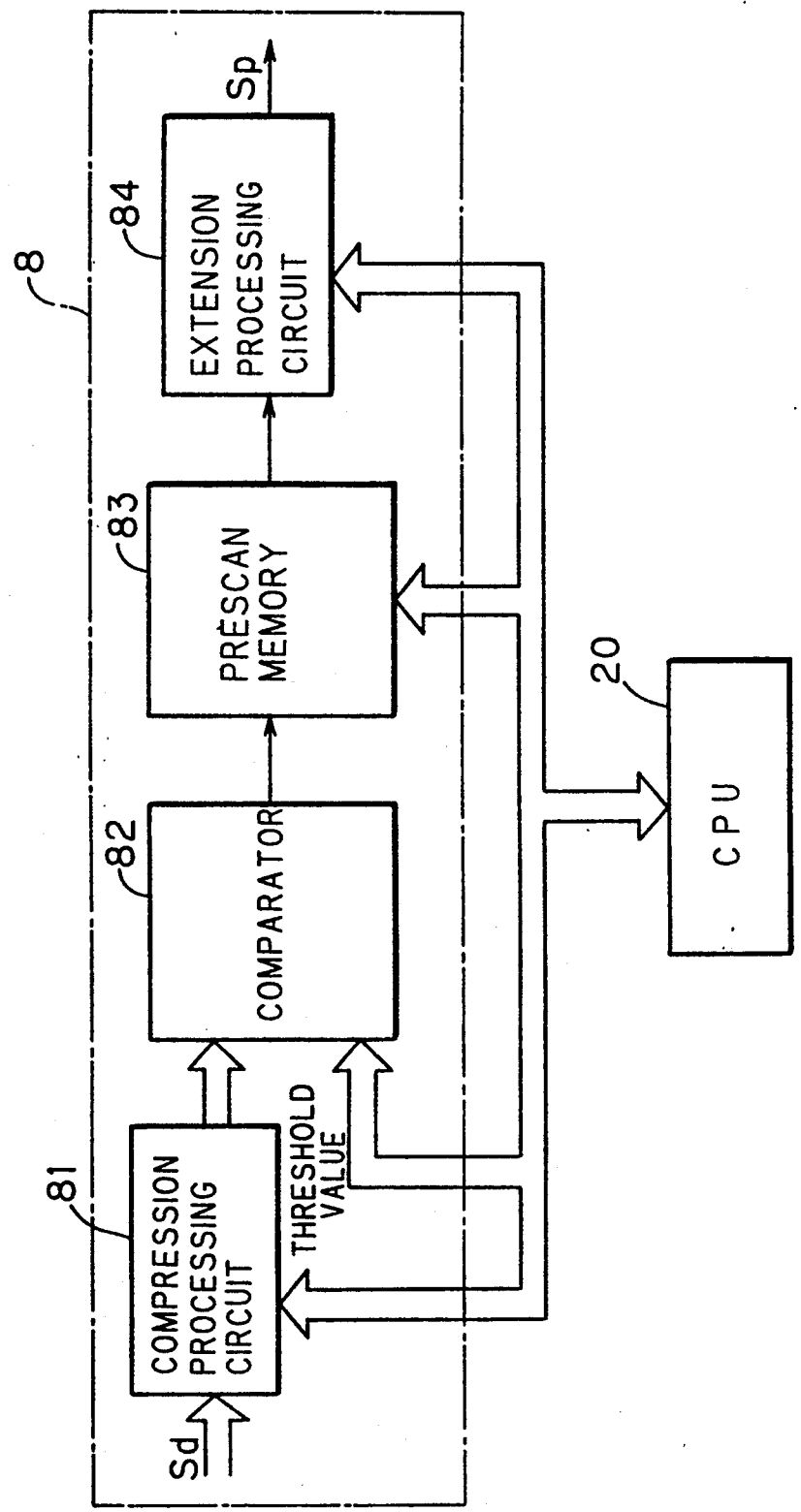
FIG. 2 is an electrical block diagram showing the construction of a prescan data storing section.

FIG. 2 illustrates the construction of the prescan data storing section 8.

A density signal Sd having each color outputted from the color correcting section 7 at the time of prescanning is thinned at a 1/N ratio, for example, at a ⅛ ratio by a compression processing circuit 81, and then is sent to a comparator 82. A lower limit threshold value and an upper limit threshold value from the CPU 20 are inputted to the comparator 82. A digital signal Sd of, for example, eight bits outputted from the color correcting section 7 is converted into a binary signal "0" or "1" on the basis of the threshold values. The binary signal obtained by the conversion is stored in the prescan memory 83.

At the time of reading out data stored in the prescan memory 83, each of the binary signals read out is outputted N times from an extension processing circuit 84 and is sent as prescan data SP to the synthesis processing section 9. The data stored in the prescan memory 83 are used for detection of document size, trimming processing, masking processing and the like. In the present embodiment, data such as input gray level-output gray level characteristic data are sent to the prescan memory 83 by the CPU 20 and stored therein, as described later.

Figure 3:
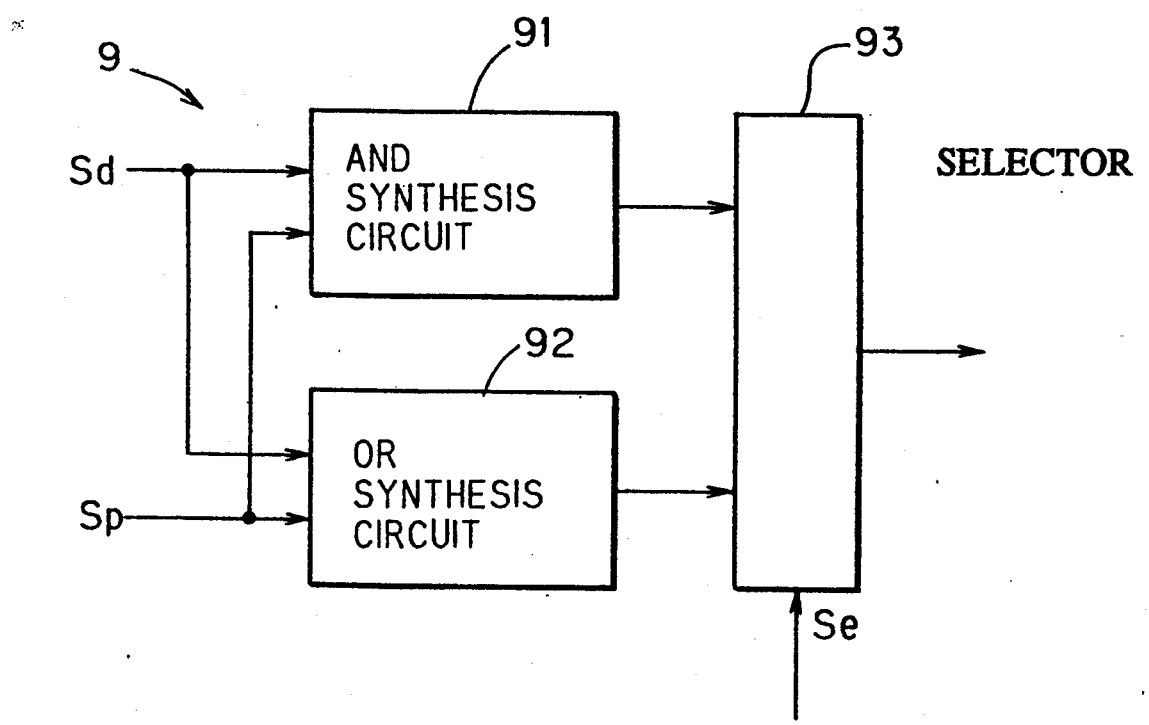
FIG. 3 is an electrical block diagram showing the construction of a synthesis processing section.

FIG. 3 illustrates the construction of the synthesis processing section 9.

The synthesis processing section 9 comprises an AND synthesis circuit 9i, an OR synthesis circuit 92, and a selector 93 for selecting either one of outputs of the synthesis circuits 91 and 92 and outputting the same on the basis of a selection signal Se from the CPU 20. An output from the color correcting section 7 (a density signal Sd) and an output from the prescan data storing section 8 (prescan data Sp) are inputted to each of the synthesis circuits 91 and 92.

The AND synthesis circuit 91 outputs the density signal Sd only when the prescan data Sp is "0". The AND synthesis circuit 91 is used for, for example, making a portion other than a document area white.

The OR synthesis circuit 92 outputs a signal corresponding to the maximum density value representing a black color when the prescan data Sp is "1" (a 8-bit signal corresponding to "255" when the density signal Sd is a 8-bit signal), while outputting the density signal Sd when the prescan data Sp is "0". When synthesis processing is performed by the OR synthesis circuit 92, the density signal Sd is controlled at the minimum density value representing a white color. Accordingly, when the prescan data Sp is "0", a signal representing the minimum density value "0" is outputted. The ON synthesis circuit 92 is used for, for example, causing the prescan memory 83 to store data to be synthesized such as a date or overlay data in the prescan memory 83 to record the data to be synthesized and the overlay data on paper, as already developed by the applicant of the present application and described in a patent (Patent Application Number 69056/1991). In the present embodiment, the OR synthesis circuit 92 is used for causing the printer section 2 to record input gray level-output gray level characteristics data, as described later.

Figure 4:
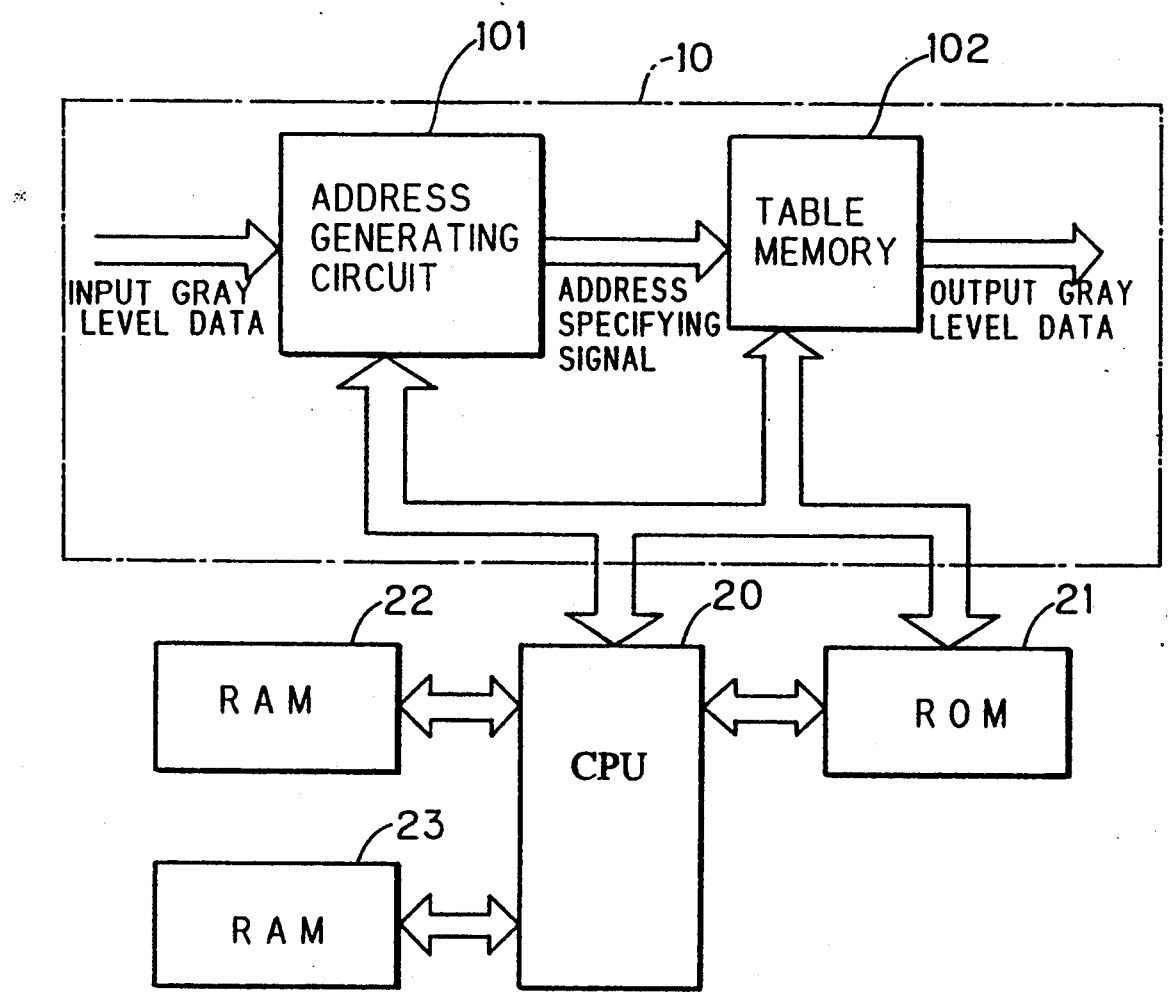
FIG. 4 is an electrical block diagram showing a density processing section.

FIG. 4 illustrates the construction of the density processing section 10.

Figure 5:
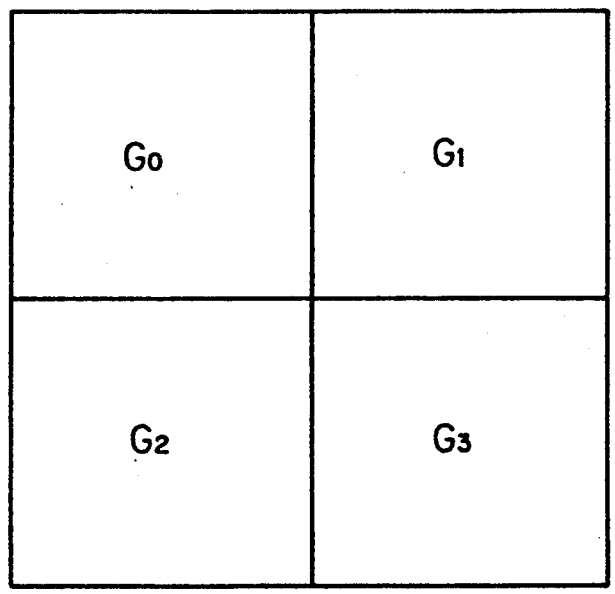
FIG. 5 is a schematic diagram showing four pixels in a dither matrix.

The density processing section 10 comprises an address generating circuit 101 and a table memory 102. A plurality of types of characteristic data representing a gray level of a recording pixel relative to a gray level of a reading pixel (input gray level-output gray level characteristic data) are stored in a ROM 21 depending on a developing color (M, C, Y or BK) density designated in the operating section and the type of document image designated in the operating section. The document images are of three types, that is, a character, a photograph, and a character-photograph, mixture. The input gray level-output gray level characteristic data are previously generated using a dither matrix having as one block 2×2 pixels $G_0$, $G_1$, $G_2$ and $G_3$ shown in FIG. 5. In this example, there are 256 gray levels of the reading pixel, and there are 64 gray levels of the recording pixel.

Input gray level-output gray level characteristic data corresponding to a developing color, the copy density designated in the operating section and the type of document image designated in the operating section out of the plurality of types of input gray level-output gray level characteristic data stored in the ROM 21 are transferred to the table memory 102 by the CPU 20. Data representing a gray level of a reading pixel (input gray level data) and a signal representing the position of the reading pixel (a pixel position signal) comprising a line signal HSYNC and a dot signal CLK (not shown) sent from the synthesis processing section 9 are sent to the address generating circuit 101.

The address generating circuit 101 outputs a 10-bit signal for specifying an address (hereinafter referred to as an address specifying signal) corresponding to the input gray level data and the pixel position signal (a pixel in the dither matrix which corresponds to the reading pixel). Lower eight bits of the address specifying signal correspond to the input gray levels 0 to 255, and upper two bits thereof correspond to each of the pixels $G_0$, $G_1$, $G_2$ and $G_3$ in the dither matrix. Values expressed by the upper two bits of the address specifying signal which correspond to each of the pixels $G_0$, $G_1$, $G_2$ and $G_3$ are "00", "01", "10" and "11". When the address specifying signal is outputted from the address generating circuit 101, data stored in a specified address in the table memory 102 is outputted as data representing an output gray level (output gray level data) from the table memory 102.

Table 1 shows one example of input gray level-output gray level characteristic data. In Table 1, base addresses Oadr 0 to 255 denote specified addresses used as the basis corresponding to input gray level data 0 to 255, and the base addresses Oadr 0 to 255 have a one-to-one correspondence with the input gray level data 0 to 255. In addition, a total gray level indicates the total of output gray levels corresponding to the four pixels in the dither matrix relative to an input gray level.

TABLE 1

| INPUT GRAY LEVEL DATA | BASE ADDRESS (Oadr) | OUTPUT GRAY LEVEL DATA | | | | TOTAL GRAY LEVEL |
|---|---|---|---|---|---|---|
| | | $G_0$ | $G_1$ | $G_2$ | $G_3$ | |
| 0 | 0 | 0 | 0 | 0 | 0 | 0 |
| 1 | 1 | 1 | 0 | 0 | 0 | 1 |
| 2 | 2 | 2 | 0 | 0 | 0 | 2 |
| . | . | . | . | . | . | . |
| 64 | 64 | 64 | 0 | 0 | 0 | 64 |
| 65 | 65 | 64 | 1 | 0 | 0 | 65 |
| . | . | . | . | . | . | . |
| 129 | 129 | 64 | 64 | 0 | 1 | 129 |
| . | . | . | . | . | . | . |
| 255 | 255 | 64 | 64 | 63 | 64 | 255 |

Figure 6:
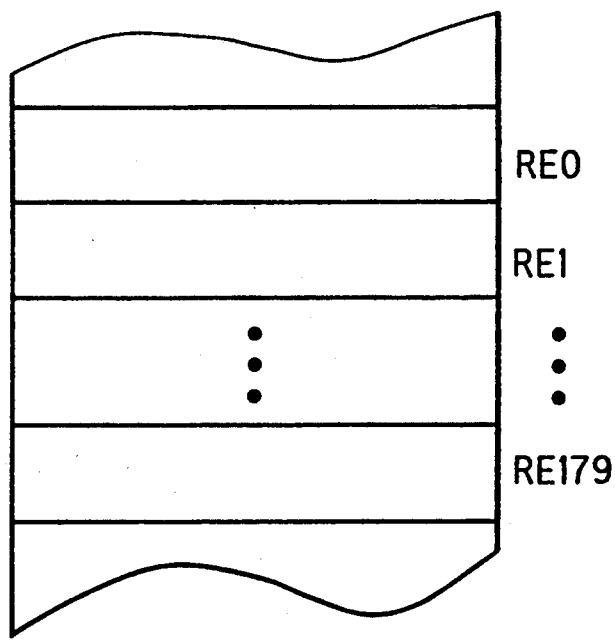
FIG. 6 is a schematic diagram showing the contents of a ROM 21.

FIG. 6 illustrates a part of the contents of the ROM 21.

In this copying machine, input gray level-output gray level characteristic data are previously generated for four types of colors (M, C, K, and BK), for 15 levels of the density designated in the operating section, and for three types of document images designated in the operating section, that is, a character, a photograph and a character-photograph mixture designated in the operating section. Specifically, 180 types of input gray level-output gray level characteristic data are respectively stored in areas $RE_0$ to $RE_{179}$ in the ROM 21.

Figure 7:
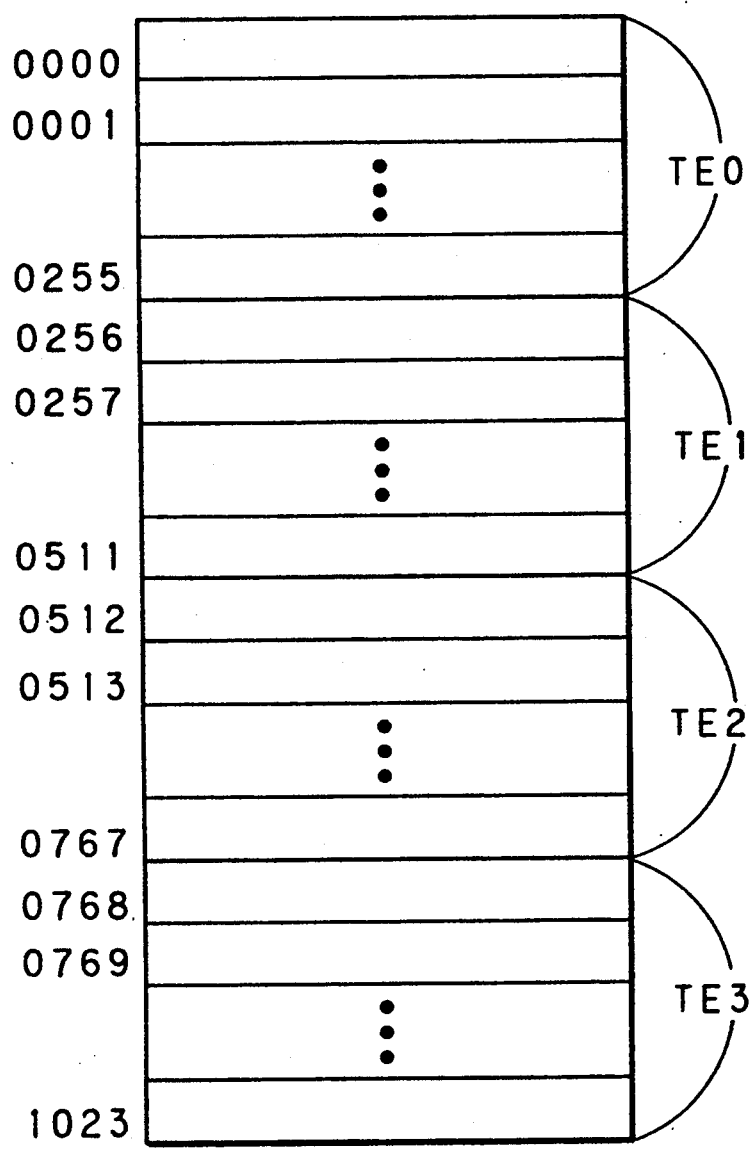
FIG. 7 is a schematic diagram showing the interior of a table memory 102.

FIG. 7 illustrates the interior of the table memory 102.

The table memory 102 is a 8-bit memory, and comprises an area $TE_0$ (addresses 0 to 255) for storing input gray level-output gray level characteristic data (256 gray levels) with respect to the pixel $G_0$ in the dither matrix, an area $TE_1$ (addresses 256 to 511) for storing input gray level-output gray level characteristic data with respect to the pixel $G_1$, an area $TE_2$ (addresses 512 to 767) for storing input gray level-output gray level characteristic data with respect to the pixel $G_2$, and an area $TE_3$ (addresses 768 to 1023) for storing input gray level-output gray level characteristic data corresponding to input gray level data with respect to the pixel $G_3$.

In the density processing section 10 in this copying machine, each of the input gray level-output gray level characteristic data stored in the ROM 21 is corrected on the basis of characteristics correcting data designated by the operation display sect ion 24.

Figure 8:
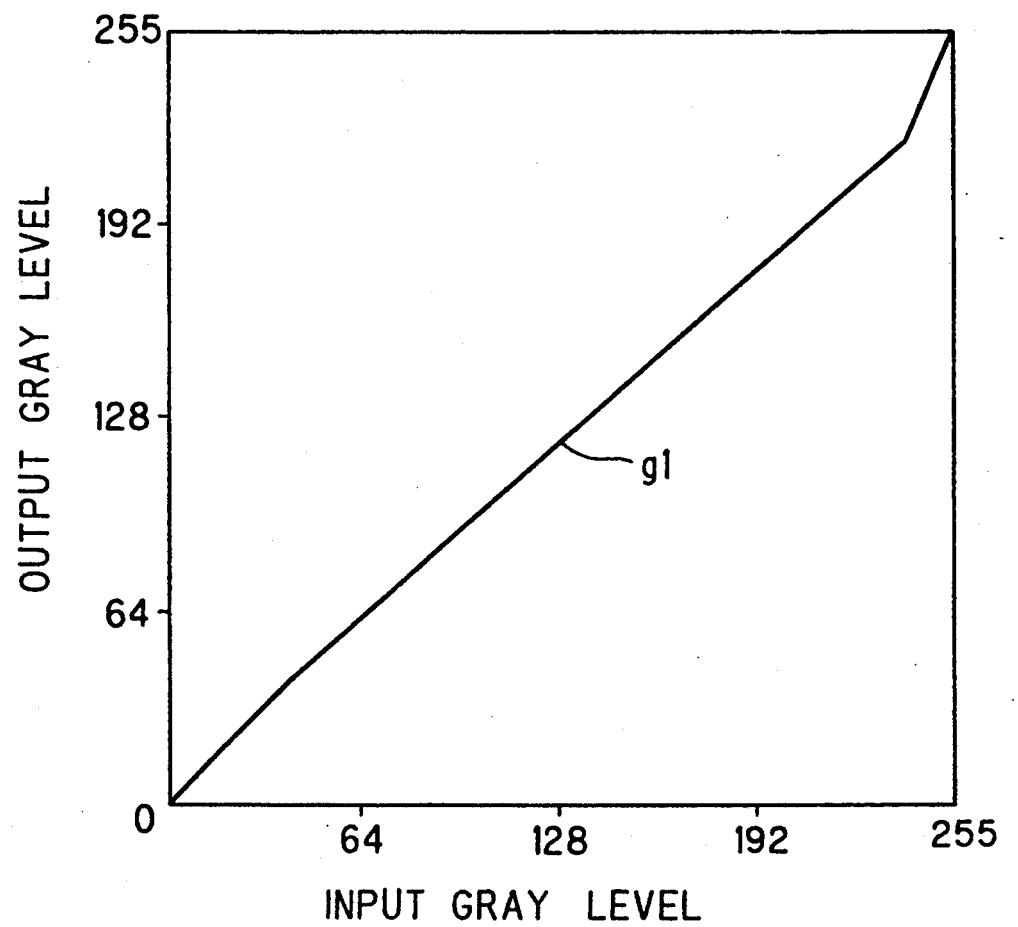
FIG. 8 is a graph showing the original input gray level-output gray level characteristic data.

Description is now made of the idea of this correction. A graph line g1 shown in FIG. 8 is obtained by graphing certain input gray level-output gray level characteristic data by using input gray levels to enter the axis of the abscissa and using total output gray levels to enter the axis of the ordinate.

In the operation display section 24, correcting data (characteristics correcting data) for correcting total output gray levels corresponding to each of a plurality of steps into which input gray levels are divided is inputted for each step. The number of steps into which input gray levels are divided can be freely set in accordance with the correction precision. In this example, it is assumed that input gray levels are divided into 10 steps. For example, if characteristics correcting data is +20, total output gray levels obtained by correction corresponding to respective input gray levels in the step become total gray levels in the original characteristics corresponding to input gray levels obtained by respectively adding 20 to the input gray levels in the step.

TABLE 2

| STEP | INPUT GRAY LEVEL | CHARACTERISTICS CORRECTING DATA |
|---|---|---|
| 1 | 0~25 | +20 |
| 2 | 26~50 | +10 |
| 3 | 51~75 | +5 |
| 4 | 76~100 | ±0 |
| 5 | 101~125 | −10 |
| 6 | 126~150 | −20 |
| 7 | 151~175 | −5 |
| 8 | 176~200 | ±0 |
| 9 | 201~225 | +10 |
| 10 | 226~255 | +5 |

Characteristics after correction on the basis of the characteristics correcting data shown in the foregoing. Table 2 are indicated by a graph line g2 in FIG. 9. In this example, the characteristics g2 after the correction in the first step are characteristics obtained by shifting a portion corresponding to the range of input gray levels 20 to 45 in the original characteristics g1 leftward by 20 input gray levels. Specifically, characteristics after the correction in each of the steps are equal to the original characteristics corresponding to input gray levels obtained by adding characteristics correcting data in the step to input gray levels in the step.

As can be seen from the graph line g2 representing the characteristics after the correction, such a reversal phenomenon that in a boundary portion between adjacent steps, a total output gray level corresponding to a higher input gray level is lower than a total output gray level corresponding to a lower input gray level may, in some cases occur, as in, for example, a portion indicated by Q. Consequently, a document image becomes nonuniform, so that the reproducibility of the document image is lowered.

Figure 9:
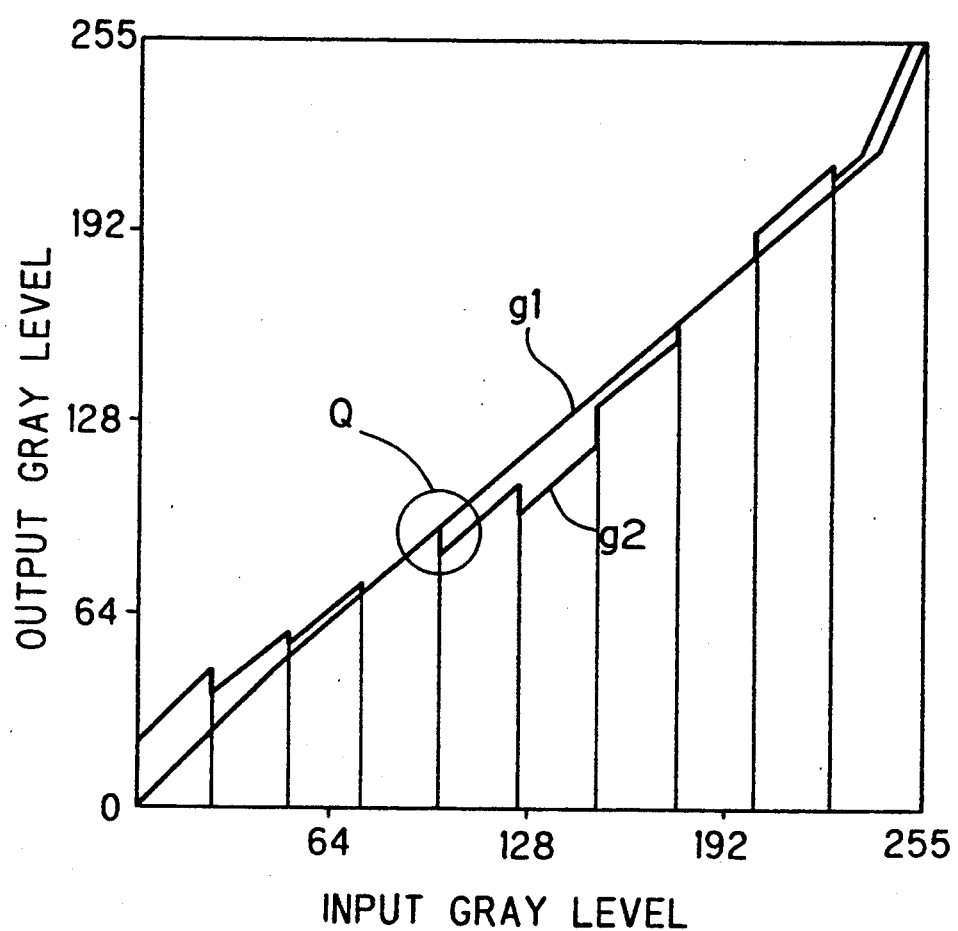
FIG. 9 is a graph showing input gray level-output gray level characteristic data obtained by correcting the input gray level-output gray level characteristic data shown in FIG. 8 on the basis of characteristics correcting data.
Figure 10:
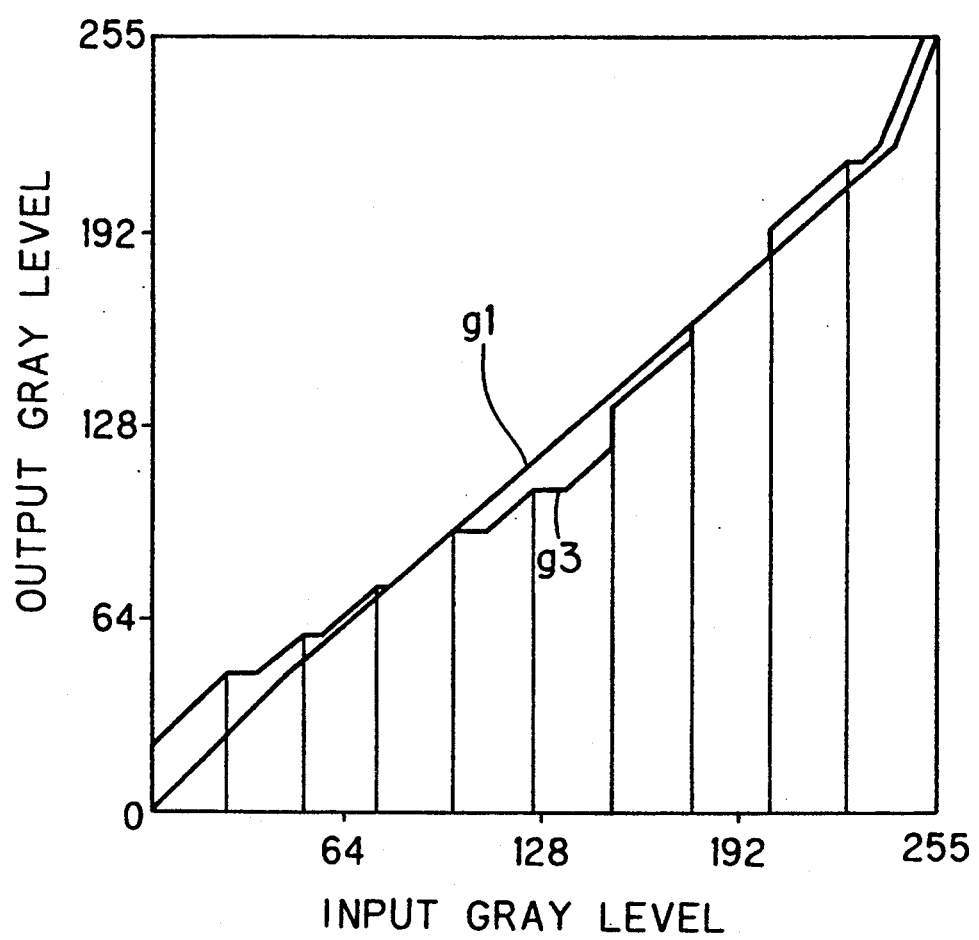
FIG. 10 is a graph showing input gray level-output gray level characteristic data after correcting a reversal phenomenon in the input gray level-output gray level characteristic data shown in FIG. 9.
Figure 11:
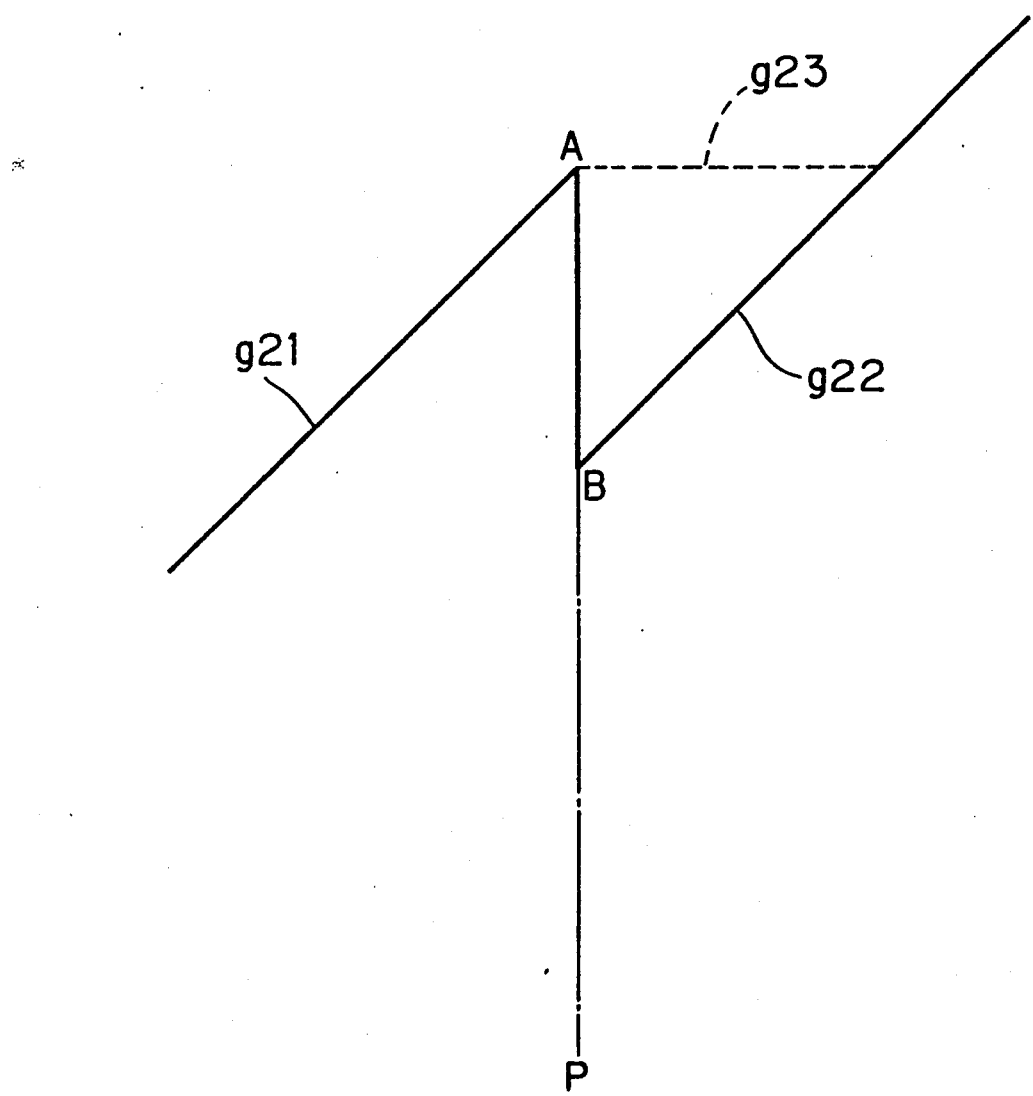
FIG. 11 is a partially enlarged view showing a portion shown in FIG. 9.

When such a reversal phenomenon occurs, therefore, the reversal phenomenon is corrected in the following manner. As shown in FIG. 11 in which the portion Q shown in FIG. 9 is enlarged, in the vicinity of a boundary point P between adjacent steps at which a reversal phenomenon occurs, such correction is made that with respect to a portion where total output gray levels in total output gray level characteristics g22 corresponding to a step at higher input gray levels are not more than the maximum value A of total output gray levels in total output gray level characteristics g21 corresponding to a step at lower input gray levels, the total output gray levels in the portion have the same value as A. Characteristics in the portion after the correction are indicated by g23. The final characteristics after correcting the original characteristics indicated by the graph line g1 in the foregoing manner are shown in a graph line g3 in FIG. 10. This copying machine has a function for recording the characteristics as indicated by the graph line g3 after the correction.

Description is now made of an operation of the copying machine for correcting input gray level-output gray level characteristic data as described above.

Referring to FIG. 4, an address specifying signal corresponding to a pixel in the dither matrix which corresponds to input gray level data and a pixel position signal is outputted from the address generating circuit 101. The CPU 20 reads out input gray level-output gray level characteristic data corresponding to a developing color, the designated copy density and the designated type of document image from the ROM 21 and transfers the same to the RAM 22. Transfer destination addresses to the table memory 102 corresponding to the input gray level-output gray level characteristic data stored in the RAM 22 are converted on the basis of characteristics correcting data inputted by the operation display section 24 and stored in the backup RAM 23.

Each of the transfer destination addresses comprises upper two bits, which express values "00", "01", "10" and "11", representing each of the areas $TE_0$, $TE_1$, $TE_2$ and $TE_3$ in the table memory 102 and lower eight bits representing addresses 0 to 255 in each of the areas $TE_0$, $TE_1$, $TE_2$ and $TE_3$. A base transfer destination address OTadr composed of the lower eight bits representing the addresses 0 to 255 in each of the areas $TE_0$, $TE_1$, $TE_2$ and $TE_3$ is converted into a new transfer destination address NTadr using characteristics correcting data Sft by the following expression (1). A transfer destination address composed of the upper two bits representing each of the areas $TE_0$, $TE_1$, $TE_2$ and $TE_3$ in the table memory 102 is not converted. The base transfer destination addresses OTadr 0 to 255 have a one-to-one correspondence to input gray levels 0 to 255 of the input gray level-output gray level characteristic data.

$$NTadr = OTadr - Sft \qquad (1)$$

The base transfer destination addresses OTadr corresponding to the input gray level-output gray level characteristic data to be transferred are converted into new transfer destination addresses NTadr for each step from the value of the corresponding characteristic correcting data Sft on the basis of the foregoing expression (1). The input gray level-output gray level characteristic data to be transferred to each of the areas $TE_0$, $TE_1$, $TE_2$ and $TE_3$ in the table memory 102 are sequentially read out from the RAM 22 and are sent to the new transfer destination addresses NTadr in the corresponding area.

For example, if the characteristics correcting data Sft corresponding to the first step (the input gray levels 0 to 25) is +20 as shown in the foregoing Table 2, the base transfer destination addresses OTadr 0 to 25 are converted into new transfer destination addresses NTadr −20 to 5.

If the characteristic correcting data Sft corresponding to the first step (the input gray levels 0 to 25) is thus positive, the new transfer destination addresses NTadr whose values are smaller than the minimum value 0 of the base transfer destination addresses OTadr are generated. Data corresponding to the new transfer destination addresses NTadr whose values are smaller than the minimum value 0 of the base transfer destination addresses OTadr are deleted. In the above described example, data corresponding to the new transfer destination addresses NTadr whose values are −20 to −1 are not transferred.

For example, if the characteristics correcting data Sft corresponding to the tenth step (the input gray levels 226 to 255) is +5 as shown in the foregoing Table 2, the base transfer destination addresses OTadr 226 to 255 are converted into new transfer destination addresses NTadr 221 to 250.

If the characteristics correcting data Sft corresponding to the tenth step (the input gray levels 226 to 255) are thus positive, blank transfer destination addresses at which there exist no data to be transferred are generated in a portion assigned large addresses in each of the areas $TE_0$, $TE_1$, $TE_2$ and $TE_3$ in the table memory 102. Therefore, the same data as data to be transferred to the maximum new transfer destination address NTadr out of the new transfer destination addresses NTadr in each of the areas is transferred to the blank transfer destination addresses.

In the above described example, the blank transfer destination addresses are generated in the portion assigned large addresses (251 to 255) in each of the areas $TE_0$, $TE_1$, $TE_2$ and $TE_3$ in the table memory 102. Accordingly, the same data as data transferred to the maximum new transfer destination address NTadr 250 out of the new transfer destination addresses NTadr in each of the areas is transferred to the blank transfer destination addresses.

If the characteristics correcting data corresponding to the first step (the input gray levels 0 to 25) is negative, blank transfer destination addresses at which there exist no data to be transferred are generated in a portion assigned small addresses in each of the areas $TE_0$, $TE_1$, $TE_2$ and $TE_3$ in the table memory 102. The same data as data to be transferred to the minimum new transfer destination address NTadr out of the new transfer destination addresses NTadr in each of the areas is transferred to the blank transfer destination addresses.

If the characteristics correcting data corresponding to the tenth step (the input gray levels 226 to 255) is negative, data corresponding to the new transfer destination addresses NTadr whose values exceed 255 are generated. Accordingly, the data are not transferred.

In order to send the input gray level-output gray level characteristic data stored in the RAM 22 to the table memory 102 using the new transfer destination addresses NTadr, when the input gray level-output gray level characteristic data are sequentially read out from the RAM 22, reversal phenomenon correction processing is performed. Specifically, output gray level data are read out in ascending order of input gray levels from the RAM 22. It is judged whether or not the output gray level data read out is larger than output gray level data sent to the table memory 102 last time. When the output gray level data read out is larger than the output gray level data sent to the table memory 102 last time, the output gray level data read out is sent to a new transfer destination address corresponding to the output gray level data read out in the table memory 102.

On the other hand, when the output gray level data read out is smaller than the output gray level data sent to the table memory 102 last time, the output gray level data sent to the table memory 102 last time is sent to a new transfer destination address corresponding to the output gray level data read out this time in the table memory 102.

Consequently, in a boundary portion where a reversal phenomenon occurs, input gray level-output gray level characteristic data are so corrected that with respect to a portion where total output gray levels in total output gray level characteristics corresponding to a step at higher input gray levels are lower than the maximum value of total output gray levels in total output gray level characteristics corresponding to a step at lower input gray levels, the maximum value of the total output gray levels in the total output gray level characteristics corresponding to the step at lower input gray levels and the total output gray levels in the portion have the same value.

When all input gray level-output gray level characteristic data are sent to the table memory 102 from the RAM 22 in the above described manner and then, an address specifying signal corresponding to input gray level data and a pixel position signal is outputted from the address generating circuit 101, data corresponding to a specified address is outputted from the table memory 102.

It is assumed that input gray level-output gray level characteristic data corresponding to input gray level data 221 to 240 out of the original input gray level-output gray level characteristic data are as shown in the following Table 3. It is assumed that the input gray level data 221 to 225 belong to the ninth step and their characteristics correcting data are +10, and the input gray level data 226 to 240 belong to the tenth step and their characteristics correcting data are +5. The relationship between the input gray level data 221 to 235 and corresponding output gray level data in a case where transfer destination addresses corresponding to the input gray level-output gray level characteristic data are converted on the basis of the foregoing expression (1) is shown in the following Table 4.

As shown in Table 4, output gray levels corresponding to the input gray level data 226 to 229 are lower than output gray levels corresponding to the input gray level data 225. Specifically, a reversal phenomenon occurs in a boundary portion between the ninth step and the tenth step. If the above described reversal phenomenon correction is made, the relationship between the input gray level data 226 to 229 and corresponding output gray level data is changed as shown in the following Table 5.

TABLE 3

| INPUT GRAY LEVEL | OUTPUT GRAY LEVEL | | | | TOTAL GRAY LEVEL | STEP CORRECTING DATA (Sft) |
|---|---|---|---|---|---|---|
| | G1 | G2 | G3 | G4 | | |
| . | . | . | . | . | . | . |
| . | . | . | . | . | . | . |
| . | . | . | . | . | . | . |
| 221 | 56 | 55 | 55 | 55 | 221 | NINTH STEP (+10) |
| 222 | 56 | 56 | 55 | 55 | 222 | NINTH STEP (+10) |
| 223 | 56 | 56 | 55 | 56 | 223 | NINTH STEP (+10) |
| 224 | 56 | 56 | 56 | 56 | 224 | NINTH STEP (+10) |
| 225 | 57 | 56 | 56 | 56 | 225 | NINTH STEP (+10) |
| 226 | 57 | 57 | 56 | 56 | 226 | TENTH STEP (+5) |
| 227 | 57 | 57 | 56 | 57 | 227 | TENTH STEP (+5) |
| 228 | 57 | 57 | 57 | 57 | 228 | TENTH STEP (+5) |
| 229 | 58 | 57 | 57 | 57 | 229 | TENTH STEP (+5) |
| 230 | 58 | 58 | 57 | 57 | 230 | TENTH STEP (+5) |
| 231 | 58 | 58 | 57 | 58 | 231 | TENTH STEP (+5) |
| 232 | 58 | 58 | 58 | 58 | 232 | TENTH STEP (+5) |
| 233 | 59 | 58 | 58 | 58 | 233 | TENTH STEP (+5) |
| 234 | 59 | 59 | 58 | 58 | 234 | TENTH STEP (+5) |
| 235 | 59 | 59 | 58 | 59 | 235 | TENTH STEP (+5) |
| 236 | 59 | 59 | 59 | 59 | 236 | TENTH STEP (+5) |
| 237 | 60 | 59 | 59 | 59 | 237 | TENTH STEP (+5) |
| 238 | 60 | 60 | 59 | 59 | 238 | TENTH STEP (+5) |
| 239 | 60 | 60 | 59 | 60 | 239 | TENTH STEP (+5) |
| 240 | 60 | 60 | 60 | 60 | 240 | TENTH STEP (+5) |

TABLE 3-continued

| INPUT GRAY LEVEL | OUTPUT GRAY LEVEL | | | | TOTAL GRAY LEVEL | STEP CORRECTING DATA (Sft) |
|---|---|---|---|---|---|---|
| | G1 | G2 | G3 | G4 | | |
| . | . | . | . | . | . | . |
| . | . | . | . | . | . | . |
| . | . | . | . | . | . | . |

TABLE 4

| INPUT GRAY LEVEL | OUTPUT GRAY LEVEL | | | | TOTAL GRAY LEVEL | STEP CORRECTING DATA (Sft) |
|---|---|---|---|---|---|---|
| | G1 | G2 | G3 | G4 | | |
| . | . | . | . | . | . | . |
| . | . | . | . | . | . | . |
| . | . | . | . | . | . | . |
| 221 | 58 | 58 | 57 | 58 | 231 | NINTH STEP (+10) |
| 222 | 58 | 58 | 58 | 58 | 232 | NINTH STEP (+10) |
| 223 | 59 | 58 | 58 | 58 | 233 | NINTH STEP (+10) |
| 224 | 59 | 59 | 58 | 58 | 234 | NINTH STEP (+10) |
| 225 | 59 | 59 | 58 | 59 | 235 | NINTH STEP (+10) |
| 226 | 58 | 58 | 57 | 58 | 231 | TENTH STEP (+5) |
| 227 | 58 | 58 | 58 | 58 | 232 | TENTH STEP (+5) |
| 228 | 59 | 58 | 58 | 58 | 233 | TENTH STEP (+5) |
| 229 | 59 | 59 | 58 | 58 | 234 | TENTH STEP (+5) |
| 230 | 59 | 59 | 58 | 59 | 235 | TENTH STEP (+5) |
| 231 | 59 | 59 | 59 | 59 | 236 | TENTH STEP (+5) |
| 232 | 60 | 59 | 59 | 59 | 237 | TENTH STEP (+5) |
| 233 | 60 | 60 | 59 | 59 | 238 | TENTH STEP (+5) |
| 234 | 60 | 60 | 59 | 60 | 239 | TENTH STEP (+5) |
| 235 | 60 | 60 | 60 | 60 | 240 | TENTH STEP (+5) |
| . | . | . | . | . | . | . |
| . | . | . | . | . | . | . |
| . | . | . | . | . | . | . |

TABLE 5

| INPUT GRAY LEVEL | OUTPUT GRAY LEVEL | | | | TOTAL GRAY LEVEL | STEP CORRECTING DATA (Sft) |
|---|---|---|---|---|---|---|
| | G1 | G2 | G3 | G4 | | |
| . | . | . | . | . | . | . |
| . | . | . | . | . | . | . |
| . | . | . | . | . | . | . |
| 221 | 58 | 58 | 57 | 58 | 231 | NINTH STEP (+10) |
| 222 | 58 | 58 | 58 | 58 | 232 | NINTH STEP (+10) |
| 223 | 59 | 58 | 58 | 58 | 233 | NINTH STEP (+10) |
| 224 | 59 | 59 | 58 | 58 | 234 | NINTH STEP (+10) |
| 225 | 59 | 59 | 58 | 59 | 235 | NINTH STEP (+10) |
| 226 | 59 | 59 | 58 | 59 | 235 | TENTH STEP (+5) |
| 227 | 59 | 59 | 58 | 59 | 235 | TENTH STEP (+5) |
| 228 | 59 | 59 | 58 | 59 | 235 | TENTH STEP (+5) |
| 229 | 59 | 59 | 58 | 59 | 235 | TENTH STEP (+5) |
| 230 | 59 | 59 | 58 | 59 | 235 | TENTH STEP (+5) |
| 231 | 59 | 59 | 59 | 59 | 236 | TENTH STEP (+5) |
| 232 | 60 | 59 | 59 | 59 | 237 | TENTH STEP (+5) |
| 233 | 60 | 60 | 59 | 59 | 238 | TENTH STEP (+5) |
| 234 | 60 | 60 | 59 | 60 | 239 | TENTH STEP (+5) |
| 235 | 60 | 60 | 60 | 60 | 240 | TENTH STEP (+5) |
| . | . | . | . | . | . | . |
| . | . | . | . | . | . | . |
| . | . | . | . | . | . | . |

In the above described embodiment, as shown in FIG. 11, in the vicinity of a boundary point P between adjacent steps at which a reversal phenomenon occurs, the reversal phenomenon is so corrected that with respect to a portion where total output gray levels in total output gray level characteristics g22 corresponding to a step at higher input gray levels are not more than the maximum value A of total output gray levels in total output gray level characteristics g21 corresponding to a step at lower input gray levels, the total output gray levels in the portion have the same value as A (such a reversal phenomenon correcting method is referred to as a first reversal phenomenon correction). However, the following reversal phenomenon correction may be made.

Figure 12:
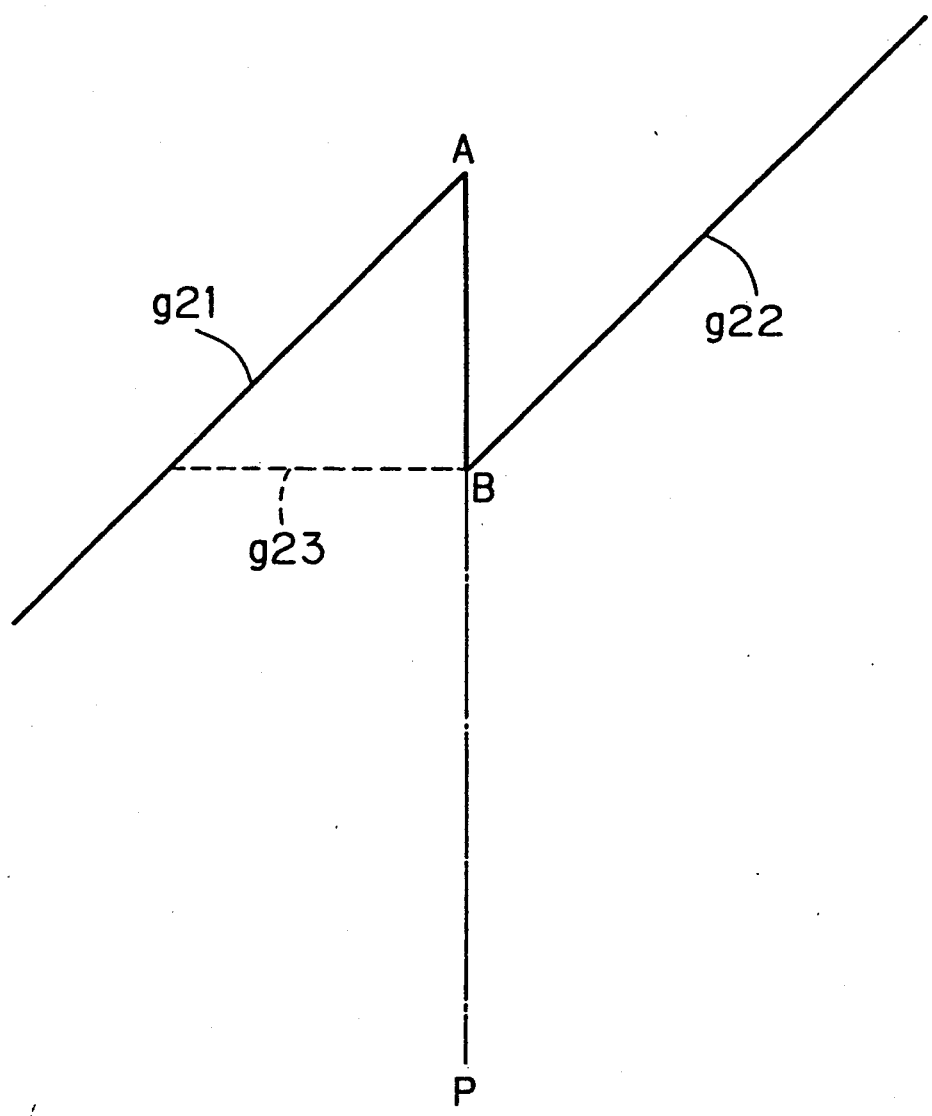
FIG. 12 is a diagram for explaining a second method for correcting a reversal phenomenon.

Specifically, as shown in FIG. 12, in the vicinity of a boundary point P between adjacent steps at which a reversal phenomenon occurs, the reversal phenomenon may be so corrected that with respect to a portion where total output gray levels in total output gray level characteristics g21 corresponding to a step at lower input gray levels are not less than the minimum value B of total output gray levels in total output gray level characteristics g22 corresponding to a step at higher input gray levels, the total output gray levels in the portion have the same value as B (such a reversal phenomenon correcting method is referred to as a second reversal phenomenon correction).

In a case where the second reversal phenomenon correction is made, the following control is carried out when input gray level-output gray level characteristic data are sent to the table memory 102 from the RAM 22. Specifically, output gray level data are read out in ascending order of input gray levels from the RAM 22. It is judged whether or not the output gray level data read out is larger than output gray level data sent to the table memory 102 last time. When the output gray level data read out is larger than the output gray level data sent to the table memory 102 last time, the output gray level data read out is sent to a new transfer destination address corresponding to the output gray level data read out in the table memory 102.

On the other hand, when the output gray level data read out is smaller than the output gray level data sent to the table memory 102 last time, output gray level data, which is larger than the output gray level data read out this time, out of past output gray level data following the output gray level data sent to the table memory 102 last time and stored therein is converted into the output gray level data read out this time and then, the output gray level data read out this time is sent to a new transfer destination address corresponding to the output gray level data read out this time in the table memory 102.

Figure 13:
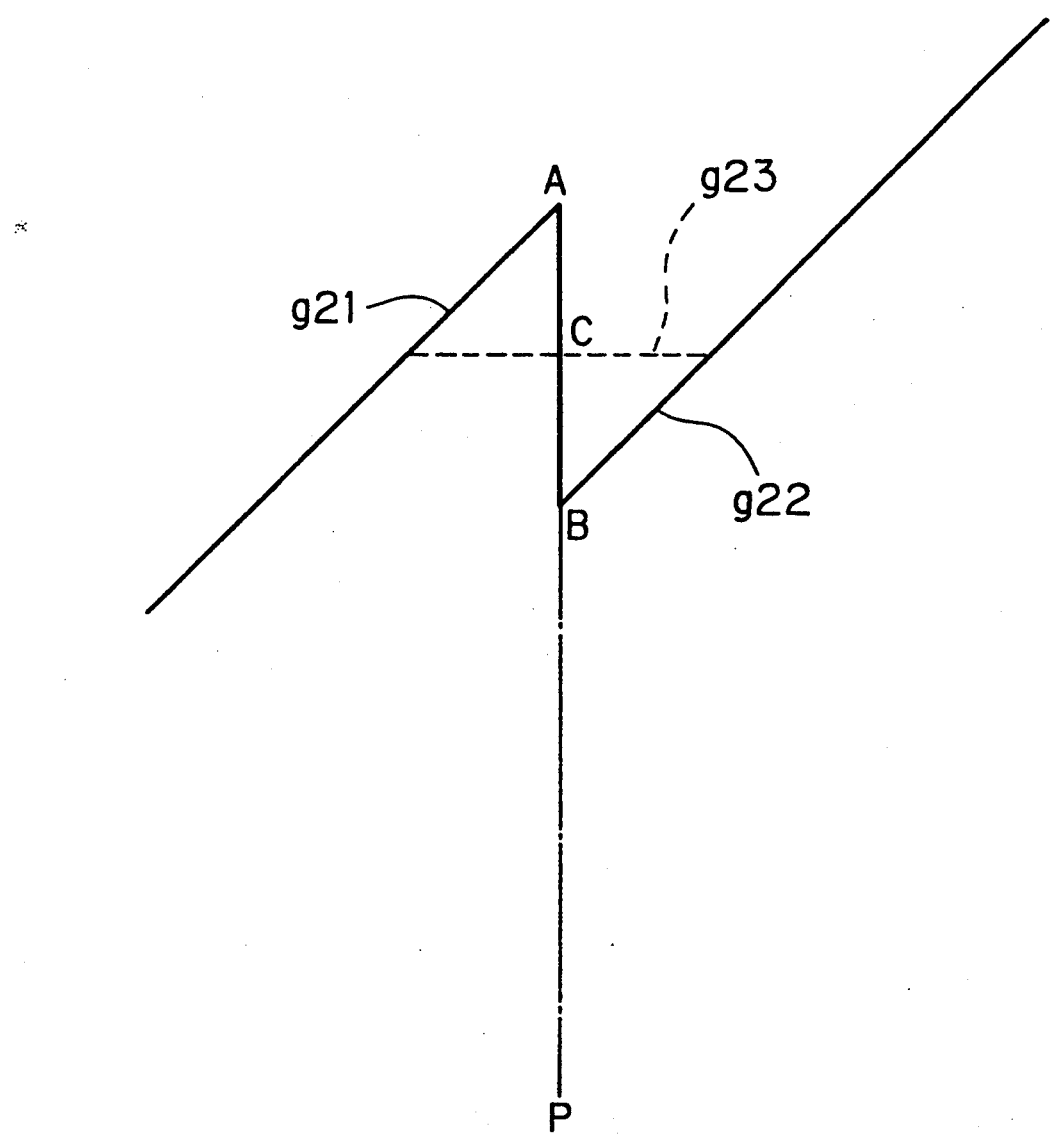
FIG. 13 is a diagram for explaining a third method for correcting a reversal phenomenon.

Furthermore, as shown in FIG. 13, in the vicinity of a boundary point P between adjacent steps at which a reversal phenomenon occurs, C is taken as an intermediate value between the maximum total output gray level A in total output gray level characteristics g21 corresponding to a step at lower input gray levels and the minimum total output gray level B in total output gray level characteristics g22 corresponding to a step at higher input gray levels. In this case, such correction may be made that with respect to a portion where total output gray levels in the total output gray level characteristics g21 corresponding to the step at lower input gray levels are higher than C and a portion where the total output gray levels in the total output gray level characteristics g22 corresponding to the step at higher input gray levels are lower than C, the total output gray levels in the portions have the same value as C (such a reversal phenomenon correcting method is referred to as a third reversal phenomenon correction).

Furthermore, in a boundary portion between adjacent steps where a reversal phenomenon occurs, any of the above described first to third reversal phenomenon corrections (a) to (c) may be selected on the basis of characteristics correcting data Sft corresponding to the step at lower input gray levels and characteristics correcting data Sft (n+1) corresponding to the step at higher input gray levels. One example of the relationship between the selecting conditions in this case and the reversal phenomenon correction to be selected is shown in the following Table 6.

TABLE 6

| SELECTING CONDITION | CORRECTION METHOD |
|---|---|
| Sft(n) ≧ 0 AND Sft(n + 1) ≧ 0 | (a) |
| Sft(n) ≧ 0 AND Sft(n + 1) ≦ 0 | (c) |
| Sft(n) ≦ 0 AND Sft(n + 1) ≦ 0 | (b) |
| Sft(n) ≦ 0 AND Sft(n + 1) ≧ 0 | (c) |

Although in the above described embodiment, the transfer destination addresses are converted and then, the reversal phenomenon is corrected, the reversal phenomenon need not be corrected. When the reversal phenomenon is not corrected, specified addresses may be converted in the address generating circuit 101 in place of converting the transfer destination addresses. Specifically, when a base address is taken as Oadr, a specified address obtained by the conversion is taken as Sadr, and characteristics correcting data is taken as Sft, a formula for address conversion is represented by the following expression (2). Also in this case, a specified address composed of upper two bits corresponding to each of the pixels $G_0$, $G_1$, $G_2$ and $G_3$ in the dither matrix is not converted.

$$Sadr = Oadr + Sft \quad (2)$$

The base addresses Oadr corresponding to input gray level-output gray level characteristic data are converted into specified addresses Sadr for each step from the value of the corresponding characteristics correcting data Sft on the basis of the foregoing expression (2).

It is assumed that one type of input gray level-output gray level characteristic data corresponding to a developing color, the designated copy density and the designated type of document image out of a plurality of types of input gray level-output gray level characteristic data stored in the ROM 21 are transferred to the table memory 102 from the ROM 21 by the CPU 20, and characteristics correcting data Sft for each step is sent to the address generating circuit 101 from the backup RAM 23 by the CPU 20. When input gray level data and a pixel position signal are sent to the address generating circuit 101, a specified address Sadr is found by the foregoing expression (2). Two bits corresponding to the pixel position signal are added to the specified address on the side of its most significant digit, thereby to generate an address specifying signal. The address specifying signal is outputted from the address generating circuit 101.

However, specified addresses obtained by the conversion Sadr corresponding to input gray level data, whose values are larger than the maximum value 255 of the base addresses Oadr by the foregoing expression (2), are fixed to the maximum value 255. In addition, specified addresses Sadr corresponding to input gray level data, whose values are smaller than the minimum value 0 of the base addresses Oadr, are fixed to the minimum value 0. When the address specifying signal is outputted from the address generating circuit 101, data at a corresponding address in the table memory 102 is outputted as output gray level data.

A table memory having a capacity capable of storing four types of input gray level-output gray level characteristic data corresponding to four developing colors may be used as the table memory 102, and the input gray level-output gray level characteristic data corresponding to the four developing colors which correspond to the type of the document image out of the plurality of types of input gray level-output gray level characteristic data stored in the ROM 21 may be transferred. In this case, a signal representing a developing color is sent to the address generating circuit 101 from the CPU 20, so that a 12-bit address specifying signal including the signal representing a developing color is outputted from the address generating circuit 101.

Figure 14:
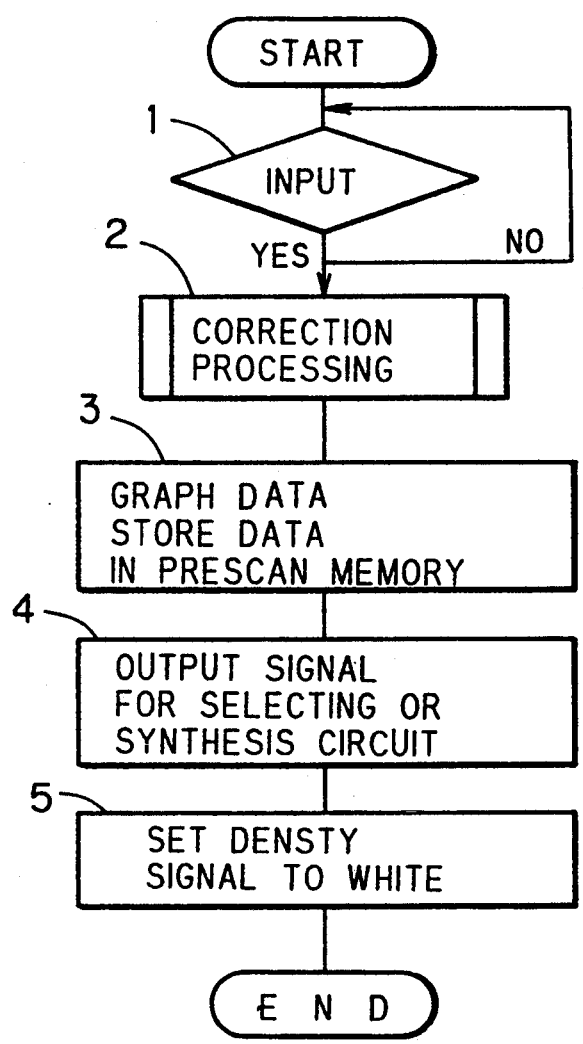
FIG. 14 is a flow chart showing the procedure for processing performed by a CPU 20 for graphing input gray level-output gray level characteristic data and outputting the same.

FIG. 14 shows the procedure for processing performed by the CPU 20 in a case where input gray level-output gray level characteristic data obtained by correction on the basis of characteristics correcting data are graphed and outputted.

An operator selects a characteristic graph output mode from the operation display section 24 and inputs the same. Further, the operator inputs a developing color, the copy density and the type of document image.

When an input operation for graphing the input gray level-output gray level characteristic data is performed (step 1), correction processing of the input gray level-output gray level characteristic data is performed (step 2). Specifically, input gray level-output gray level characteristic data corresponding to the developing color, the copy density and the type of document image inputted are read out from the ROM 21 shown in FIG. 4 and transferred to the RAM 22, and transfer destination addresses are converted as described above on the basis of characteristics correcting data stored in the backup RAM 23, so that the input gray level-output gray level characteristic data stored in the RAM 22 are sequentially sent to new transfer destination addresses in the table memory 102. In this case, the above described reversal phenomenon correction is made.

When the input gray level-output gray level characteristic data are stored in the table memory 102, the input gray level-output gray level characteristic data are read out from the table memory 102, and binary data representing a graph line corresponding to the input gray level-output gray level characteristic data after the correction read out is bit-map developed into the prescan memory 83 shown in FIG. 2 (step 3). Specifically, a point on the graph line corresponding to the input gray level-output gray level characteristic data after the correction is indicated by black data "1", and the other portion thereon is indicated by white data "0".

A control signal Se for selecting an output of the OR synthesis circuit 92 is then sent to the selector 93 in the synthesis processing section 9 shown in FIG. 3 (step 4). In addition, white data is so set in the BK producing section 6 that an output of the BK producing section 6 becomes a signal representing a white color (step 5). Consequently, the value of a density signal Sd inputted to the synthesis processing section 9 becomes "0" representing a white color.

Thereafter, when a print start key provided for the operation display section 24 is pressed by the operator, the binary data representing the graph line corresponding to the input gray level-output gray level characteristic data after the conversion is read out from the prescan memory 83 and sent to the synthesis processing section 9. In the OR synthesis circuit 92 in the synthesis processing section 9, the maximum density value is outputted when the binary data Sp read out from the prescan memory 83 is "1", while the density signal Sd representing a white color ("0") is outputted when the binary data Sp is "0". The output of the OR synthesis circuit 92 is sent to the printer section 12 through the selector 93, the density processing section 10 and the variable magnification and movement processing section 11, to accomplish recording on paper. Consequently, the input gray level-output gray level characteristic data after the correction are graphed and outputted.

The original input gray level-output gray level characteristic data stored in the ROM 21 are read out, and binary data representing a graph line corresponding to the original input gray level-output gray level characteristic data is stored in the prescan memory 83, thereby to make it possible to graph the original input gray level-output gray level data and output the same.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   first storing means for storing input gray level-output gray level characteristic data which represent an output gray level relative to an input gray level;
   a density processing section which receives input gray level-output gray level characteristic data from said first storing means, said density processing section including a second storing means for storing input gray level-output gray level characteristic data transferred to said density processing section from said first storing means, and address generating means for generating addresses corresponding to said second storing means in response to input gray level data, said second storing means and said address generating means cooperating to supply output gray level data from an address in said second storing means when said address is specified by said address generating means;
   inputting means for inputting characteristic correcting data, said characteristic correcting data providing input gray level-output gray level corrections corresponding to a plurality of division steps which divide input gray levels;
   correcting means for correcting input gray level-output gray level characteristic data stored in said first storing means on the basis of characteristic correcting data supplied by said inputting means; and
   reversal phenomenon correcting means for making an input gray level-output gray level characteristic data correction where an output gray level of a first input gray level step having relatively low input gray levels is higher than an output gray level of a second input gray level step having relatively high input gray levels, so that said output gray level of said first input gray level step is no higher than said output gray level of said second input gray level step.

2. The image forming apparatus according to claim 1, wherein
   said characteristic correcting data are data for modifying access addresses to said second storing means, and
   said correcting means modifies the access addresses to said second storing means in accordance with said characteristic correcting data, to correct the input gray level-output gray level characteristic data in accordance with said characteristic correcting data.

3. The image forming apparatus according to claim 2, wherein
   access addresses to said second storing means are specified addresses in said second storing means corresponding to the input gray level data.

4. The image forming apparatus according to claim 1, further including:
   means for graphing the input gray level-output gray level characteristic data after correcting of a reversal phenomenon by said reversal phenomenon correcting means, when a reversal phenomenon occurs in the input gray level-output gray level characteristic data and generating a graph corresponding to the input gray level-output gray level characteristic data.

* * * * *